UNITED STATES PATENT OFFICE.

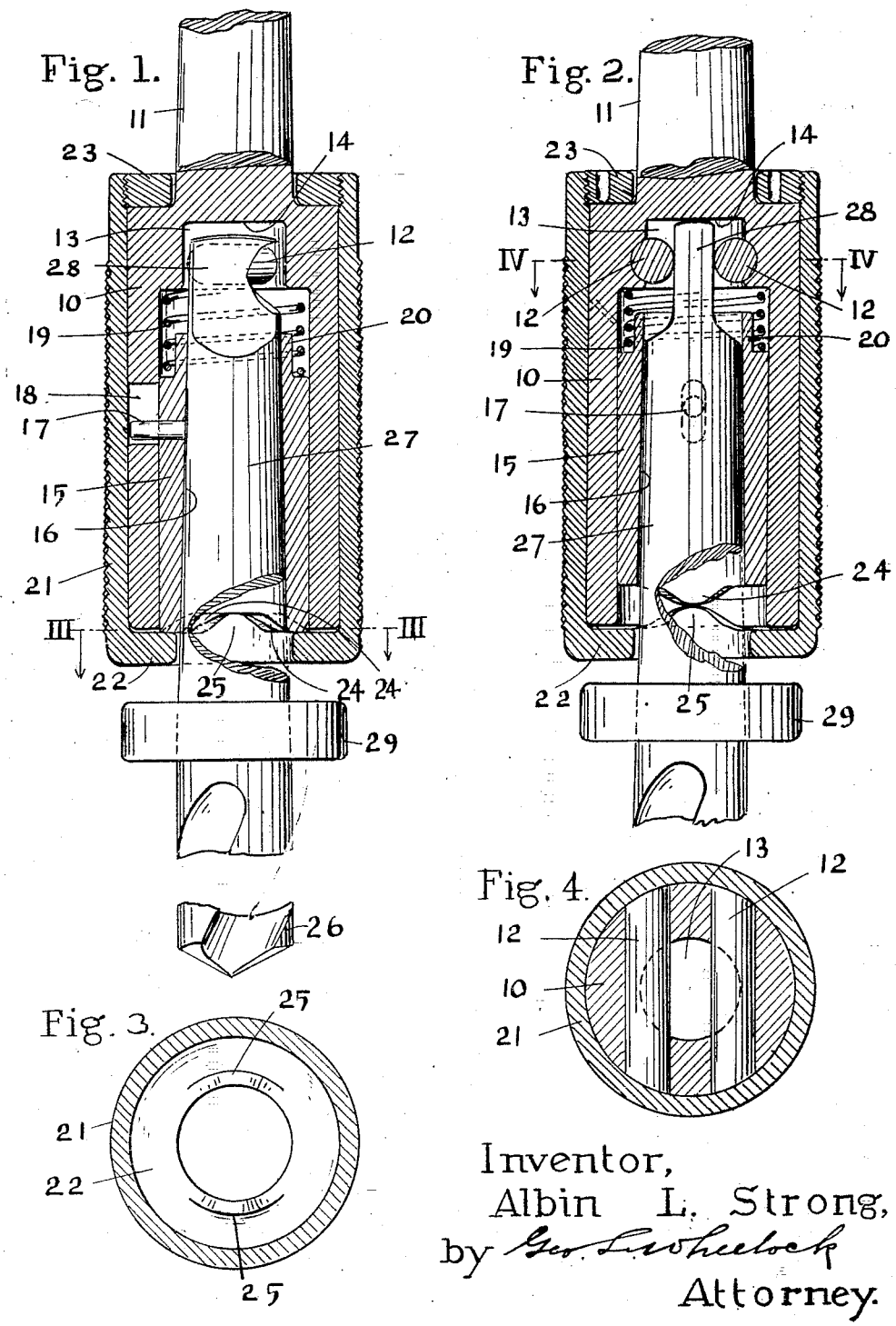

ALBIN L. STRONG, OF HOBOKEN, NEW JERSEY.

DRILL-CHUCK OR THE LIKE.

1,340,845. Specification of Letters Patent. Patented May 18, 1920.

Application filed April 12, 1919. Serial No. 289,718.

*To all whom it may concern:*

Be it known that I, ALBIN L. STRONG, a citizen of the United States, and resident of Hoboken, in the county of Hudson and State of New Jersey, have invented certain new and useful Improvements in Drill-Chucks or the like, of which the following is a specification.

This invention relates to drill-chucks or the like. Much valuable time is lost and inconvenience encountered in removing a drill from, and putting another drill in, a drilling machine, where the machine is stopped from running. There are drill chucks, however, which are designed to enable the substitution of one drill for another when the drilling machine is running, but so far as known to me such chucks have a number of defects. These defects are overcome by the present improvements to be described.

One of the objects of my invention is, therefore, to provide a chuck from which a taper-shank drill can be instantaneously and automatically released, while the machine is running, without there being a tendency to retain the drill, which tendency is due to a restraining, binding action between the tapered shank and the chuck at the moment that it is desired to eject the drill. Another object is to provide means for properly guiding the tang of the tapered drill-shank into its seat or recess in the rotating chuck at the moment that the drill is pushed into the chuck, and, to grip and engage said tang in such a way that it is not damaged by the action of the engaging surfaces, while the actual gripping and holding parts can be removed when worn. Other objects of the invention are: to provide a chuck which need only be grasped tightly by one hand, during rotation, in order to release the drill; to provide a chuck which acts positively and quickly, both in the act of engaging and disengaging a drill; and to provide a simple, efficient and thoroughly practical chuck.

These being among the objects of the invention the same consists of certain features of construction and combinations of parts to be hereinafter descibed and then claimed, with reference to the accompanying drawings illustrating a desirable embodiment of the invention and in which—

Figure 1 is a central longitudinal section of the chuck, and a drill, with the parts in normal position, parts being in elevation;

Fig. 2 is a similar section with the same parts in the position which is brought about by tightly grasping the hand-grip or casing of the chuck;

Fig. 3 is a transverse section, line 3—3, Fig. 1, and

Fig. 4, a section on line 4—4, Fig. 2.

Referring to the drawings, the chuck has a metallic, cylindrical socket-member 10, which is provided with a shank 11, usually tapering, for firm attachment to the drilling machine or apparatus. The closed end of the socket-member 10 is intersected by round tool-gripping pins 12, 12, these being preferably of hard steel, or they may be of other hard metal, but they should be quite hard inasmuch as they are subjected to much friction and strain, especially a crushing-strain. Said pins bridge or span opposite sides of an axial recess or space 13, in the closed end of the socket-member 10, and are driven tightly into corresponding round holes in the said member, although they may be driven out and removed, when it is necessary to remove them because of their worn condition.

A cylindrical metallic member 15, has a snug sliding fit in the socket of member 10, and is provided with a central, longitudinal, tapered bore 16, which extends entirely throughout for receiving the shank of a tool. While said sliding member 15, may slide in the socket-member 10, it will be carried around by the rotation of the socket-member, due to a pin 17 driven removably into the sliding-member 15, and which engages the walls of a longitudinal slot 18, in the socket-member 10. As will appear later on, the said sliding-member is confined in the socket-member in its movements. It is spring-pressed, however, so as to tend to urge it toward the open end of the socket-member, and for this purpose a helical spring 19 fits around a reduced neck 20, on said sliding-member, said spring being seated against the shoulder at the base of said neck and bearing on the closed end of the socket-member.

Means for positively actuating the sliding-member 15, are furnished by a hollow or tubular, cylindrical hand-grip or handle-member 21, which fits snugly yet movably upon the socket-member 10, and which is confined on the latter by an inturned annular flange 22, at one end thereof and a collar or ring 23, which is screwed into the other end of said cylindrical hand-grip. Such a construction will prevent the longitudinal movement of the hand-grip but will allow of the socket-member rotating within the same when it is desired. Cams 24, are formed on the outer end of the spring-pressed member 15, and these may engage or be engaged by corresponding cams 25, formed on the inner side of the hand-grip 21.

The drill or other such tool 26, has a taper-shank 27, and a tang 28, and may be of a common construction, except that it is preferred to provide the tool with a collar or flange 29, driven tightly onto the tapered shank.

The chuck such as described is used as follows: To connect the drill with the chuck, the workman engages two fingers under the collar 29 thereon, if the chuck be in rotation, and presses the shank of the drill into the chuck as far as it will go and then releases hold on the drill,—which will then be held by the chuck, the parts being in the position shown in Fig. 1. It will be noted that the tapered surfaces of the drill and spring-pressed member will be in a frictional or binding engagement so that the drill is held against longitudinal displacement. In the act of applying the drill to the chuck, the tang 28 will probably be pushed against the rounded or beveled surfaces of the coupling pins 12, but if the chuck be in rotation the end of the tang 28 will ride on the said surfaces and will be cammed by them and move directly into the recess 13 and in engagement with the coupling pins, which will cause the drill to rotate. It is a very simple matter to disengage the drill whenever desired, even though the parts be in rotation. This is done by merely grasping the milled or roughened hand-grip 21, and firmly, and, without the necessity of sliding the hand-grip longitudinally, the cams 25 thereon will bear on the cams 24, which ride over the former, whereupon the spring-pressed member 15 will be immediately pushed back, against the spring pressure, and the drill will be released and may be dropped from the chuck.

The invention is obviously susceptible of more or less modification, without departing from the spirit and scope of the invention.

What I claim as new is as follows:—

1. In a drill-chuck or the like, the combination of a socket-member having, at its closed end, an irregular recess, the walls of which may couple with the tang of a taper-shank drill, a spring-pressed, internally tapered, hollow cylindrical member guided in the socket for engaging the taper of the drill, a tubular handle fitted loosely, against longitudinal movement, on said socket-member, and camming means between the handle and spring-pressed member, for the purposes set forth.

2. In a drill-chuck or the like, the combination of a socket-member having, at its closed end, spaced, removable, rounded pins, forming an irregular recess, which pins may couple with the tank of a taper-shank drill, a spring-pressed, internally tapered, hollow, cylindrical member guided in the socket for engaging the taper of the drill, a tubular handle fitted loosely, against longitudinal movement, on said socket-member, and camming means between the handle and spring-pressed member, for the purposes set forth.

3. In a drill-chuck or the like, the combination of a socket-member having, at its closed end, an irregular recess, the walls of which may couple with the tang of a taper-shank drill, a spring-pressed, internally tapered, hollow, cylindrical member guided in the socket for engaging the taper of the drill, a tubular handle fitted loosely, against longitudinal movement, on said socket-member, and a plurality of cams on said handle and spring-pressed member, for mutual engagement, for the purposes set forth.

4. In a drill-chuck or the like, the combination of a socket member having, at its closed end, spaced, removable, rounded pins, forming an irregular recess, which pins may couple with the tang of a taper-shank drill, a spring-pressed, internally tapered, hollow, cylindrical member guided in the socket for engaging the taper of the drill, a tubular handle fitted loosely, against longitudinal movement, on said socket-member, and a plurality of cams on said handle and spring-pressed member, for mutual engagement, for the purposes set forth.

5. In a drill-chuck or the like, the combination of a socket-member having, at its closed end, an irregular recess, the walls of which may couple with the tang of a taper-shank drill, a spring-pressed, internally tapered, hollow, cylindrical member guided in the socket for engaging the taper of the drill, a tubular handle fitted loosely on said socket-member, a pin-and-slot connection between the spring-pressed member and socket-member, said slot extending longitudinally of the same, and camming means between the handle and spring-pressed member, for the purposes set forth.

6. In a drill-chuck or the like, the combination of a cylindrical socket-member having at its closed end two spaced, removable, rounded pins, between which pins the tang of a taper shank drill may couple, an internally tapered, cylindrical and hollow, member, movable longitudinally in the socket for engaging the taper of the drill, means for causing the two said members to turn together, a helical spring coiled around said internally tapered, hollow, member and bearing against the closed end of the socket-member at one end and said tapered, hollow, member, at the other end, a tubular handle fitted loosely on said socket-member, said handle having a flange on its lower end and means coöperating therewith at its opposite end, for holding said handle against longitudinal movement, but permitting a relative rotary movement of the handle and socket-member, and mutually engageable cams on the said flange and said internally tapered, hollow, member, whereby when the chuck is rotating the tang of the drill will be caused to bear against the bottom of the socket-member and the drill allowed to drop from said tapered, hollow, member, if said handle be firmly grasped.

7. In a drill-chuck or the like, the combination of a socket-member, and a rotary tool provided with a tapered shank having a tang, said socket-member having means for coupling with the tang in order to rotate and bear on said tool; with means for holding said tool against dropping away from the chuck and for automatically releasing it from the chuck, said means comprising a hand-grip cam-member mounted on said socket-member for a rotary movement with said socket-member, and for a rotary movement of said socket-member in it, and a spring-pressed cam-member movable within but rotatable with said socket-member, said cam-member last named having a taper bore to fit the taper of said shank and the cams of said two cam-members coöperating to cause rotation of the hand-grip cam-member, the latter being adapted to be gripped, and stopped, to release the tool.

8. In a drill-chuck or the like, in combination, a cylindrical socket-member, spaced, removable and rounded, tool-coupling pins, driven transversely into the upper portion of said socket-member, a hollow cylindrical handle, loose on said socket-member, and extending over the ends of said removable pins, and means arranged in the socket-member and associated with said handle for frictionally holding the tool in position and to automatically release it.

Signed at New York, in the county of New York and State of New York, this ninth day of April A. D. 1919.

ALBIN L. STRONG.